United States Patent
Burbidge, III et al.

(10) Patent No.: US 7,328,134 B1
(45) Date of Patent: Feb. 5, 2008

(54) ENTERPRISE INTEGRATION TEST TOOL

(75) Inventors: Theodore A. Burbidge, III, Olathe, KS (US); David W. Dankenbring, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 618 days.

(21) Appl. No.: 10/787,709

(22) Filed: Feb. 26, 2004

(51) Int. Cl.
G21C 17/00 (2006.01)
(52) U.S. Cl. ...................................... 702/186
(58) Field of Classification Search ................. 702/186
See application file for complete search history.

(56) References Cited

U.S. PATENT DOCUMENTS

| | | | |
|---|---|---|---|
| 5,920,722 A | 7/1999 | Damron | 395/706 |
| 6,249,886 B1 | 6/2001 | Kalkunte | 714/47 |
| 6,449,739 B1 | 9/2002 | Landan | 714/47 |
| 6,477,483 B1* | 11/2002 | Scarlat et al. | 702/186 |
| 2002/0198684 A1* | 12/2002 | Gross et al. | 702/186 |
| 2003/0086536 A1* | 5/2003 | Salzberg et al. | 379/15.02 |
| 2003/0225563 A1* | 12/2003 | Gonos | 703/22 |

OTHER PUBLICATIONS

James D. Barnes, et al., *Distributed Large-Scale Application Benchmark System*, Filing Date—Dec. 23, 2003, U.S. Appl. No. 10/745,212, Specification (27 pgs.) and Drawings (3 sheets).

Rajendra P. Cheedella, et al., *Data Loading Tool for Loading a Database*, Filing Date—Aug. 29, 2003, U.S. Appl. No. 10/652,264, Specification (26 pgs.) and Drawings (7 sheets).

Alfredo Edwin Gunara, et al., *Simulator Tool For Testing Software In Development Process*, Filing Date—Aug. 18, 2003, U.S. Appl. No. 10/643,328, Specification (32 pgs.) and Drawings (8 sheets).

Balagurunathan Balasubramanian, et al., *Method and Software for Testing and Performance Monitoring*, Filing Date—May 31, 2001, U.S. Appl. No. 09/871,304, Specification (43 pgs.) and Drawings (12 sheets).

\* cited by examiner

*Primary Examiner*—John Barlow
*Assistant Examiner*—Jonathan Moffat

(57) ABSTRACT

A system for load testing an integrated enterprise computer system is provided. The system uses a forecast that predicts future use of the integrated enterprise computer system. The forecast maintains a predicted volume of transactions and a predicted mix of transactions for the integrated enterprise computer system. The system includes an application list that details front-end applications of the integrated enterprise computer system. The application list identifies whether the front-end applications will participate in the load testing. The system further includes a generator to generate a test data file having transactions randomly used by scripts to test the integrated enterprise computer system. The generator produces the test data file using the predicted volume and mix of transactions maintained by the forecast and based on the front-end applications participating in the load test. A method for load testing using the test data file is also provided.

28 Claims, 3 Drawing Sheets

ENTERPRISE INTEGRATION TEST TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to load testing computer software, and more particularly, but not by way of limitation, to a system and method for generating test data and for using the test data to test a back-end computer system.

BACKGROUND OF THE INVENTION

Enterprises need to anticipate when the processing load on their computer systems, such as a customer service system, will exceed the system capacity in order to expand the system capacity in time to avoid service outages. In some cases, delays in handling, for example, customer calls due to inadequate computer system resources can be directly linked to quantifiable losses of revenue. Expanding computer system capacity before it is required, merely to ensure that the computer system capacity is not exceeded, results in sinking enterprise capital into computing resources well before these resources are actually needed.

Enterprises may conduct load testing of their computer systems to evaluate when increasing customer service loads will exceed system capacity and to evaluate system processing barriers. For example, it may be that the computer system has adequate processing power, but that a communication bottleneck between the processors and the secondary storage causes system transaction throughput to bog down.

In the process of rolling out new or modified software or systems, it may be preferable to test the software and systems under real-world conditions before putting them into a production environment. By creating or simulating production loads, flaws or weaknesses in the code or systems may also be uncovered and repaired or improved prior to actual implementation.

SUMMARY OF THE INVENTION

The present disclosure provides, according to one embodiment, a system to generate test data for load testing a computer system. The system includes a forecast maintaining a predicted volume of transactions and a predicted mix of transactions for the computer system. The system also includes an application list maintaining a list of at least some applications of the computer system. The application list is related to participation of the at least some of the applications in load testing. The system further includes a generator operable to generate a list of transactions for testing the computer system using the predicted volume and mix of transactions maintained by the forecast and based on the applications identified by the applications list.

In one embodiment, a method for load testing a computer system is provided. The method includes providing an application list related to a plurality of applications of the computer system. The list further relates to the participation of the plurality of applications in load testing. The method includes providing a forecast defining the expected frequency of occurrences of each of a plurality of transaction types and providing a transaction list of at least some of the plurality of transaction types used by the computer system. The method also includes receiving control inputs from a first graphical user interface. The control inputs include a designation of the computer system and a percentage of the expected frequency. The method provides for generating a test data file based on the forecast, the transaction list, the designation of the computer system, and the percentage of the expected frequency. The method also includes running a script using the test data file to send, in a random order, the transactions in the test data file to the computer system to load test the computer system.

In another embodiment, a system for load testing a computer system is provided that includes a computer system comprising a plurality of servers, a plurality of message systems, and a plurality of front-end applications. The plurality of servers to process for one or more back-end enterprise applications. Each of the plurality of message systems is associated with at least one of the plurality of servers. The plurality of front-end applications each communicate with at least one of the plurality of servers.

The system includes a forecast detailing transactions for the computer system from the front-end applications. The forecast includes a predicted volume of transactions and predicted mix of transaction types of the transactions. A transaction set detailing transactions employed by the computer system is also provided. The system includes a graphical user interface operable for selecting at least one of the forecasts and the transaction set. The graphical user interface is further operable for selecting front-end applications based on participation of the front-end application in load testing.

The system includes a data generation tool which is operable, using the forecast and the transaction set, to generate to a test data file having transactions of substantially the same percentage mix of transaction types as the predicted mix of transaction types in the forecast. The data generation tool is further operable, based on the front-end applications participating in load testing, to exclude from the test data file any transactions from front-end applications participating in the load test. The system includes a plurality of script files to randomly read the test data file and to communicate the transactions to at least one of the message systems. The system also includes a metrics component that is in communication with the plurality of servers to obtain a load test status from the plurality of servers. The metrics component is further capable of generating a report based on the load test status.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
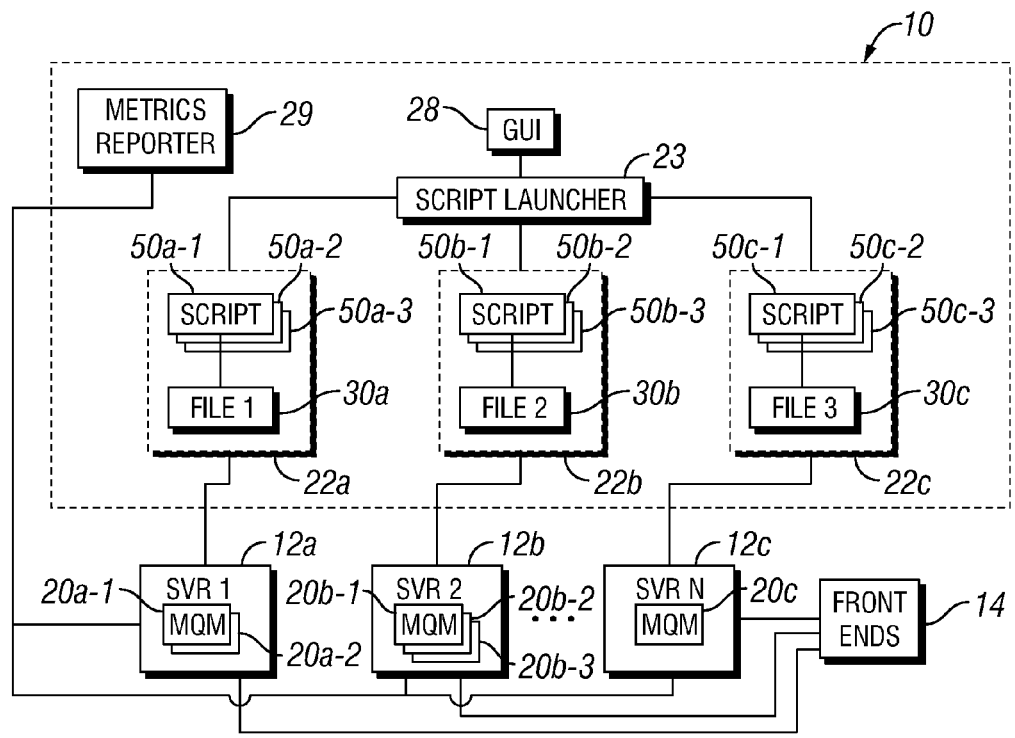
FIG. 1 is a block diagram illustrating a testing system according to one embodiment.

Turning now to FIG. 1, a diagram of a load testing system 10 is depicted. In conducting load testing, the closer the test conditions match the expected future system conditions, such as transaction load and transaction type mix, the more accurately the testing is likely to predict the future behavior of the computer system. Accurate load testing may enable an enterprise to plan computer system expansions better and to defer committing capital and other resources until it is really needed. The load testing system 10 is in communication with a plurality of server computers 12, such as the computer system under test. The server computers 12 are intended to handle a heavy volume of operation requests. The load testing system 10 tests to verify that the server computers 12 can handle the required volume of operation requests. The server computers 12 include a first server 12a, a second server 12b, and an n-th server 12c where n is the total number of the plurality of server computers 12. The load testing system 10 is comprised of interoperating computer programs or applications which may execute on one or more general purpose computer systems. General purpose computer systems will be discussed in greater detail hereinafter.

The load testing system 10 sends requests for processing or for operations to the server computers 12, and the server computers 12 complete the requested processing or operations. One or more message queue managers 20 execute on each one of the server computers 12, for example message queue managers 20a-1 and 20a-2 execute on server computer 12a, message queue managers 20b-1, 20b-2, and 20b-3 execute on server computer 12b, and message queue manager 20c executes on server computer 12c. The message queue managers 20 receive and queue the requests for processing—each request being a message containing a transaction request—sent by the load testing system 10. The applications on the server computers 12 read the messages containing transaction requests from the message queue managers 20 and perform the requested transactions. Thus, directing a message to a specific one of the message queue managers 20 effectively directs the message, and the transaction request embedded in the message, to a specific one of the server computers 12. In the preferred embodiment the message queue managers 20 are IBM MQ Series Queue Managers.

The server computers 12 may provide the back-end processing for enterprise computer applications, for example a credit check application, a credit card payment system application, a check payment system application, a member management system application, a billing system application, a subscription control system application, a provisioning system application, a field service management (FSM) application, and other business systems. In the preferred embodiment, the server computers 12 are used only for test purposes, but conform to the same configuration and specification as the in-service or production enterprise computer systems. The requests for processing and operations may be referred to as transaction requests or simply as transactions. The actual processing of these requests may also be referred to as transactions or transaction processing. Whether a transaction is really a transaction request or a transaction will be apparent from the context.

One or more application front-ends 14 may also generate and send requests for processing or for operations to the server computers 12. This may happen when groups responsible for developing the application front-ends wish to test their front-end application end-to-end with the back-end systems.

A plurality of transaction request generators 22, denoted alphanumerically as a first transaction request generator 22a, a second transaction request generator 22b, and a third transaction request generator 22c, are in communication with the message queue managers 20. The transaction request generators 22 generate transaction requests which are sent to the message queue managers 20. A script launcher 23 is in communication with and provides control inputs to the transaction request generators 22. The script launcher 23 may also be referred to as a script controller module.

A test control graphical user interface (GUI) 28 is in communication with and provides control inputs to the script launcher 23. The test control GUI 28 is also in communication with a server metrics reporter 29 to obtain the results of the load testing of the server computers 12. The server metrics reporter 29 is in communication with and receives processing status information from the server computers 12.

The first transaction request generator 22a comprises a first transaction test data file 30a and a plurality of script instances 50a-1, 50a-2, and 50a-3. Similarly, the second request generator 22b comprises a second transaction test data file 30b and a plurality of script instances 50b-1, 50b-2, and 50b-3 and the third request generator 22c comprises a third transaction test data file 30c and a plurality of script instances 50c-1, 50c-2, and 50c-3. Each of the script instances 50a, 50b, and 50c are instances of a script 50 which may also be termed a generic script. The first transaction test data file 30a comprises lines each of which defines a transaction request. The transaction request comprises a transaction type identification, a designation of one of the message queue managers 20, and any required transaction request argument data. For example, a transaction request to bill a long distance phone call to a customer account may comprise the appropriate transaction type identification and transaction request argument data such as a customer account number, a phone call type, a phone call start time and a phone call end time.

All of the transactions defined in the first transaction test data file 30a may be directed to the same one of the server computers 12, for example to the first server computer 12a. The types of the transactions defined in the first transaction test data file 30a are present in numbers which provide a proportional representation of the expected or desired frequency of that type of transaction to be sent to the computer servers 12 in the operational computer system handling actual business processes. In an exemplary system, 25% of business system transactions are of the credit check transaction type, 25% of business system transactions are of the credit card charge transaction type, and 50% of business system transactions are of the billing transaction type. The first transaction test data file 30*a* to test this exemplary system might comprise 100 transaction definitions of which 25 transactions would be credit check transaction type, 25 transactions would be credit card charge transaction type, and 50 transactions would be billing transaction type. In this manner, transactions in the transaction test data file 30*a* proportionally represent the actual frequency of transaction types of transaction requests desirably sent to the first server computer 12*a* during testing.

In the illustrated embodiment, the script instances 50*a*, as directed by the script launcher 23, randomly select lines to read from the first transaction test data file 30*a*, read the selected line, and send the associated transaction requests to the one of the message queue managers 20 designated in the selected line. The test data file 30*a* is read randomly because, in the preferred embodiment, many transaction requests of a single transaction type may be clustered together in a block in the transaction test data file 30*a*. The reading the transaction requests randomly from the transaction test data file 30*a* more accurately models the operational environment. Alternatively, the transaction test data file 30*a* could be read sequentially by the script instances 50*a* with the transactions organized appropriately in the transaction test data file 30*a*. In another embodiment, other combinations may be employed such as randomly locating the transactions in the transaction test data file 30*a* and randomly reading the transactions from the transaction test data file 30*a*.

The script launcher 23 receives a control input from the test control GUI 29 specifying how many script instances 50*a* to create. The number of script instances 50*a* is selected to provide the needed transaction load volume to sufficiently stress the first server computer 12*a* associated with the first transaction request generator 22*a*. Because each of the script instances 50*a* is reading different lines randomly from the transaction test data file 30*a*, the sequence of transaction requests sent by the first transaction request generator 22*a* to the message queue managers 20*a*-1 and 20*a*-2 results in a random mix of transaction types roughly equivalent to the desired mix of transaction types.

Each of the other transaction request generators 22, including the second transaction request generator 22*b*, and the third transaction request generator 22*c*, exhibit the same internal structure as that described for first transaction request generator 22*a*. Each of the transaction test data files 30 contain transaction definitions directed to one or more of the server computers 12. In one embodiment, each of the transaction request generators 22 direct the scripts 50 to separate computer servers 12. In other embodiments, only one transaction request generator 22 is used to direct scripts 50 for testing all of the computer servers 12. The test control GUI 28 specifies the number of script instances 50 the script launcher 23 is to launch for each of the transaction request generators 22. Note that the number of script instances 50*a*, the number of script instances 50*b*, and the number of script instances 50*c* launched by the script launcher 23 are all independent of one another. The number of script instances 50 launched by the script launcher 23 may be increased or decreased during the load testing activities.

In the preferred embodiment, the script launcher 23 is the Mercury Interactive LoadRunner tool. The test control GUI 28 controls the script launcher 23 by invoking the application programming interface of the Mercury Interactive LoadRunner tool. The usual practice for using the Mercury Interactive LoadRunner tool is to encode testing functionality vertically in a unique script and to launch multiple instances of this unique script. If different script functionality is required, multiple unique scripts are designed and launched. In a complex testing environment, the process of crafting individual scripts becomes time intensive and error prone. Additionally, the coordination and launching of these individual scripts in a complex testing environment is a manual process prone to error. The present embodiment provides for using the script 50, which is generic, and to embed individuality and customization in the transaction test data files 30. This may be less subject to error and is less cumbersome to bring into operation at test time.

Much of the intelligence of the load testing system 10 is contained in the transaction test data files 30. The transaction test data files 30 are associated with one of the server computers 12 where transaction requests are directed. The mix of transaction types in these files controls the mix of transaction requests presented to the server computers 12. The specific one of the message queue managers 20 where messages embedding transaction requests are routed is defined in the transaction test data files 30. Since the appropriate mix of transaction types is effectively determined by the test data files 30, the present disclosure enables generation of the transaction test data files 30 automatically in a flexible manner.

Figure 2:
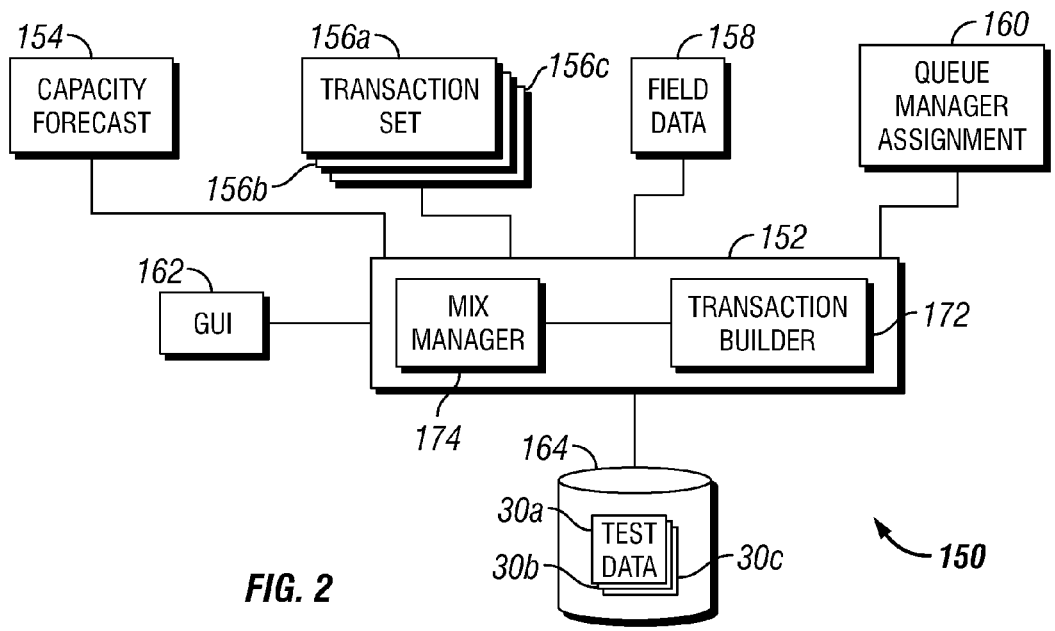
FIG. 2 is a block diagram illustrating a test data generation system according to one embodiment.

Turning now to FIG. 2, the preferred embodiment of a test data generation system 150 is depicted. The test data generation system 150 comprises a test data generator 152, a capacity forecast 154, a plurality of transaction type set files 156 including a first transaction type set file 156*a*, a second transaction type set file 156*b*, and a third transaction type set file 156*c*, a field data file 158, a queue manager assignment table or file 160, a GUI 162, and a database 164 containing the transaction test data files 30*a*, 30*b*, and 30*c*. The test data generator 152 may also be referred to as a transaction generation tool. The capacity forecast 154 may also be referred to as an operation profile. The transaction test data files 30 contain transaction requests to be used to test several back-end computer system applications, as depicted in FIG. 1. The test data generator 152 and the GUI 162 are computer programs which may execute on a general purpose computer system. In the preferred embodiment the GUI 162 is not web based, but in another embodiment the GUI 162 may be web based.

The test data generator 152 is in communication with the capacity forecast 154, the transaction type set files 156, the field data file 158, the queue manager assignment table or file 160, and the GUI 162. The test data generator 152 generates the transaction test data files 30 based on control inputs received from the GUI 162, the contents of the capacity forecast 154, the contents of the transaction type set files 156, the field data file 158, and the queue manager assignment table or file 160.

The capacity forecast 154 may be provided from various sources such as the capacity planners of an organization and may be based on estimates of future growth and expansion of the business. The capacity forecast 154 predicts the peak frequency of each transaction type at a specific point in time, such as for a specific month. The capacity forecast 154 contains an entry for every combination of transaction type, enterprise front-end application calling the transaction, and one of the message queue managers 20. A front-end application is a utility or program which provides some function for customers, enterprise personnel, or others, for example opening an account for a new cellular phone subscriber. Each capacity forecast 154 entry further defines the predicted frequency per hour at which the transaction type will be invoked by the specified enterprise front-end application. Each capacity forecast 154 entry also indicates to which message queue, and hence to which one of the server computers 12 the transaction request should be routed.

The transaction type set files 156 each identify all the transactions that are available in a specific version of the back-end systems under test. For example, the first transaction type set file 156a may identify all transactions available in release 5.3 of the back-end system, the second transaction type set file 156b may identify all transactions available in the system patch of release 5.3 of the back-end system, and the third transaction type set file 156c may identify all transactions available in release 5.5 of the back-end system. In some enterprise back-end systems, for example, there may be as many as 400 separate transaction types available, and the transaction types available from one back-end system version to another may vary. The GUI 162 selects which transaction type set files 156 that the test data generator 152 will use to generate the transaction test data files 30.

One of the transaction type set files 156 may also be used to remove specific transaction types which are known to be broken or malfunctioning in the back-end system at the time of load testing. This may be accomplished, for example, by opening the first transaction type set file 156a for editing, and removing the specific transaction types from the first transaction type set file 156a. This may also be accomplished by saving the first transaction type set file 156a under a new name, for example a new transaction type set file 156, generating the transaction test data file 30 based on the new transaction type set file 156, and then using the load testing system 10, depicted in FIG. 1, to test with the transaction test data file 30. Also, the appropriate one of the transaction type set files 156, for example the first transaction type set file 156a, may be used corresponding to the transactions available in the system release to be tested.

The field data file 158 defines the values of transaction argument fields, for example a phone number or customer name, which are needed by the test data generator 152 to generate valid transaction requests. The GUI 162 may also be employed to define field data for transaction types. The queue manager assignment table or file 160 identifies on which one of the server computers 12 each message queue manager runs.

One or more front end systems may be involved during load testing. For example, the systems managers of a particular front-end application may contact, or be contacted by, the load tester to give notice of whether their front-end system will participate in the load test. This may be accomplished in any number of manners, including electronically, for example, by the system managers logging into the GUI 162 and noting their participation for the appropriate front-end application. The system managers of the particular front-end application may desire to test their front-end application directly with the back-end systems during the load test as a means of testing the operability of their front-end application. In this case, it is undesirable for the test data generator 152 to generate the transaction load which the capacity forecast 154 identifies for these front-end systems.

For example, if a web-site front-end system that will participate in the test is predicted to generate 40 credit check transactions per hour, the test data generator 152 should not generate credit check transactions for that web-site front-end system. The GUI 162 provides a control input for selecting those front-end applications for which transaction requests are to be generated and stored in the transaction test data files 30. This may be accomplished by selecting the front-ends that may or may not participate in the testing and have the test data generator 152 account for the associated transactions accordingly, while analyzing the capacity forecast 154.

The test data generator 152 is comprised of a transaction builder component 172 and a mix manager component 174. The transaction builder component 172 builds complete, valid transaction requests. The mix manager component 174 is responsible for calculating the number of each transaction type to be built so as to attain the transaction mix indicated by the capacity forecast 154 and also to request the transaction builder component 172 to build these transaction requests.

The transaction builder component 172 receives requests from the mix manager component 174 to build a certain number of transaction requests for a specific transaction type. The transaction builder component 172 is operable to construct the transaction requests associated with each of the transaction types for use by the server computers 12. In some embodiments, the transaction builder component 172 may build transaction requests according to transaction type structure definitions provided in a file, thus making the transaction builder component 172 more flexible in the presence of change. The transaction builder component 172 reads field data associated with the transaction request transaction type from the field data file 158. In some cases, specific field data may not be repeated from one transaction request to another because of business logic. The back-end systems, for example, may reject a transaction request to open a new account under a user name which is already in the system. In this case, the transaction builder component 172 has an algorithm for generating non-duplicate field data for successive transaction requests of the same transaction type.

The mix manager 174 is responsible for requesting the transaction builder 172 to build all the needed transactions for the transaction test data file 30a. The mix manager 174 must calculate the number of each transaction type required to achieve the appropriate mix of transaction types based upon the transactions predicted in the capacity forecast 154 and the front-ends that will or will not participate in the test. The GUI 162 sends a control input identifying one of the server computers 12 for which the transaction test data file 30 is to be generated. The GUI 162 receives a control input identifying the fraction of the total hourly load of transaction requests identified in the capacity forecast that the mix manager 174 should request for the transaction builder 172 to generate. For example, if the GUI 162 specifies that 1 percent of the forecast transaction requests should be generated, and the capacity forecast predicts 4 million transactions per hour, the mix manager 174 will request 1 percent of these 4 million transaction be built by the transaction builder 172, resulting in 40,000 transaction requests being generated.

The mix manager 174 reads the transaction type set file 156, and for each transaction type entry in the transaction type set file 156, the mix manager 174 searches the capacity forecast 154 for lines that match the transaction type entry and that match one of the message queue managers 20 associated with the server computer 12 selected by the GUI 162. An association between the server computer 12 and the message queue managers 20 is determined by reading the queue manager assignment table or file 160. When a matching transaction type is found in the capacity forecast 154, the mix manager 174 confirms that the front-end identified in the capacity forecast 154 has been selected for building transaction requests. If the capacity forecast 154 entry satisfies these two checks, an appropriate number of corresponding transactions are generated to the transaction test data file 30.

The transaction requests for a transaction type may be contiguously located in the transaction test data file 30. In this case, the non-random arrangement of transaction requests may make it useful to randomly read from the transaction test data files 30, as discussed earlier with regard to FIG. 1. In an alternate embodiment, the mix manager 174 may write the transaction requests in a random manner to the transaction test data files 30, in which case the random reading from the transaction test data files 30 is obviated. In the preferred embodiment, advantages may be obtained by randomly reading the transactions, regardless of the order in the transaction test data file 30, to more accurately simulate the actual test conditions.

The resulting transaction test data file 30 contains a set of transaction requests which includes the mix of transaction types defined in the capacity forecast 154, while not including any transaction requests associated with a front-end application that will be directly participating in load testing. The transaction test data file 30 also includes the target computer server 12 for each transaction. The test data generation system 150 produces transaction request mixes which, in a preferred embodiment, correlate with the capacity forecast 154 within 0.5 percent.

Figure 3A:
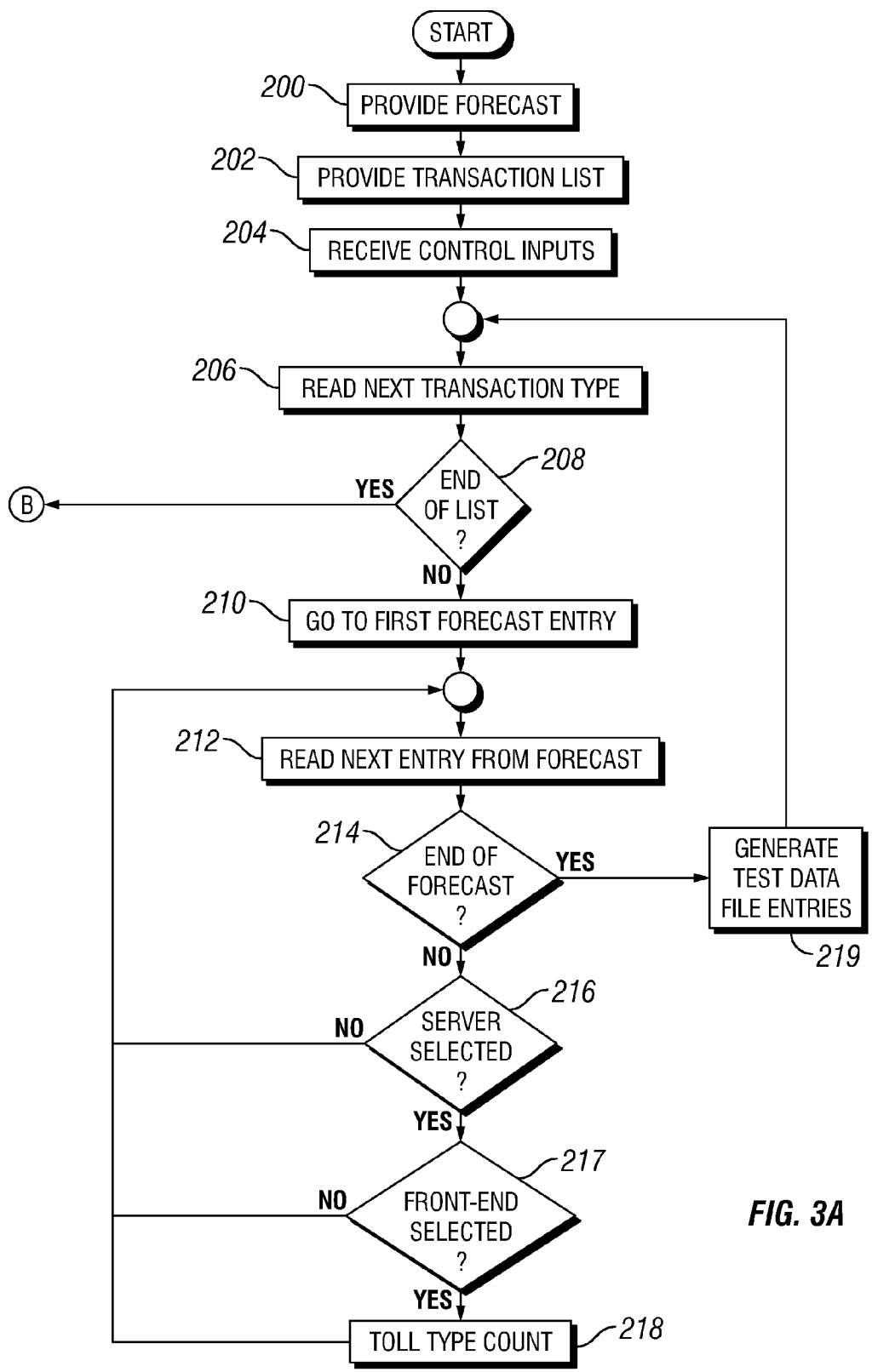
FIG. 3A is a flowchart illustrating a first portion of a process for load testing a back-end computer system.
Figure 3B:
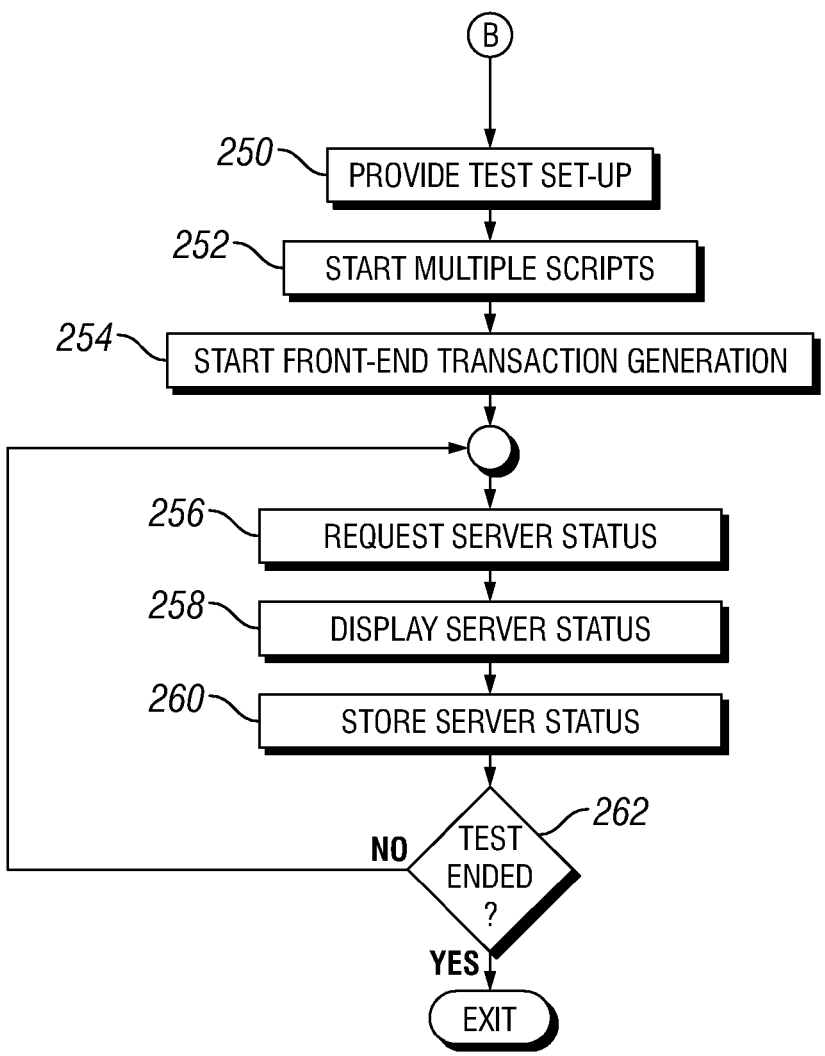
FIG. 3B is a flowchart illustrating a second portion of a process for load testing a back-end computer system.

Turning now to FIG. 3A and FIG. 3B, an exemplary process for generating transaction test data files 30 using the test data generation system 150 and for conducting load testing using the system depicted in FIG. 1 is represented. The process proceeds to block 200 where the capacity forecast 154 is provided.

Typically some team or group within an enterprise may be responsible for generating predictions of what transaction loads will be presented to the back-end systems, and these predictions will be captured in the capacity forecast 154. The process proceeds to block 202 where the transaction type set files 156 are provided. The process proceeds to block 204 where control inputs of the GUI 162 provide for the selection of a percentage which controls how many transaction requests are to be generated, the selection of one of the transaction type set files 156, the selection of front-end systems for which transaction requests are to be generated, and the selection of one or more of the server computers 12 where the requested transactions will be directed.

The process proceeds to block 206 where the next line from the selected transaction type set file 156 is read. This line will identify a transaction type. At a block 208, if the line read from the transaction type set file 156 was the end of the file, such as where no line was read because end-of-file was encountered, the process flows to label B. The processing associated with label B is depicted in FIG. 3b. If the line read from the transaction type set file 156 was not the end of the file, the process proceeds to block 210 in which the capacity forecast 154 is opened and preparation is made to read from the start of the capacity forecast 154.

The process proceeds to block 212 where the next entry from the capacity forecast 154 is read. At a block 214, if a valid line was read from the capacity forecast 154 the process proceeds to block 216. At block 216, if one of the message queue managers 20 identified in the capacity forecast 154 entry matches the one of the server computers 12 selected by the control inputs from the GUI 162, the process proceeds to block 217, otherwise the process proceeds to block 212. At block 217, if the front-end identified in the capacity forecast 154 entry matches one of the front-ends identified by the control inputs from the GUI 162, the process proceeds to block 218, otherwise the process proceeds to block 212.

At block 218, a type count is tolled or incremented. This type count will be used in a later block to generate all of entries in the transaction test data file 30 associated with the selected type. The type count is tolled or incremented by an amount appropriate for the number of transactions to be generated for this line in the capacity forecast 154. The process flows to block 212 where the next entry in the capacity forecast 154 and the processing blocks 214 through 218 are repeated.

If, at block 216, the entry read from the capacity forecast 154 does not identify a transaction type selected for transaction request generation (as, for example, by being listed in the transaction type set file 156), the process proceeds to block 219 where transaction requests of the selected type are generated in the number indicated by the count and written to the transaction test data file 30. Also, at block 219, the type count is reset to zero. At block 214, if the line read from the capacity forecast 154 is invalid, that is if no line is read because end-of-file is encountered, the process flows to block 206 and the next line from the transaction type set file 156 is read and the processing of blocks 208 through 218 is repeated. In this manner, the complete transaction test data file 30 is created.

Note that the process described above and illustrated in FIG. 3A is an illustrative example. Other related algorithms for processing the capacity forecast 154 and the transaction type set file 156 to generate the desired transaction test data file 30 will readily suggest themselves to one skilled in the art. These alternate algorithms are all contemplated by this disclosure.

Turning now to FIG. 3B, the process from FIG. 3A is continued. At block 250 the load test is set up. Control inputs are provided by the test control GUI 28 defining how many instances of the generic script 50 are to be launched and identifying what transaction test data file 156 is to be used for load testing. Using the test control GUI 28, more scripts may be added or removed during testing activities. The process proceeds to block 252 where the scripts are launched by the script launcher 23. The process proceeds to block 254 where the front-end systems 14 that will participate in the back-end system load testing are started and begin sending transaction requests to the computer servers 12.

The process proceeds to block 256 where the metrics reporter 29 requests the status of the server computers 12. The process proceeds to block 258 where the test control GUI 28 displays the processing status of the server computers 12. The process proceeds to block 260 where the metrics reporter 29 writes the status of the server computers 12 to a file. At a block 262, if the test is ended, as for example by a control input to the test control GUI 28 concluding the test, the process exits. Otherwise, if no test ending control input is received, the process proceeds to block 256 where status is updated repeatedly.

Figure 4:
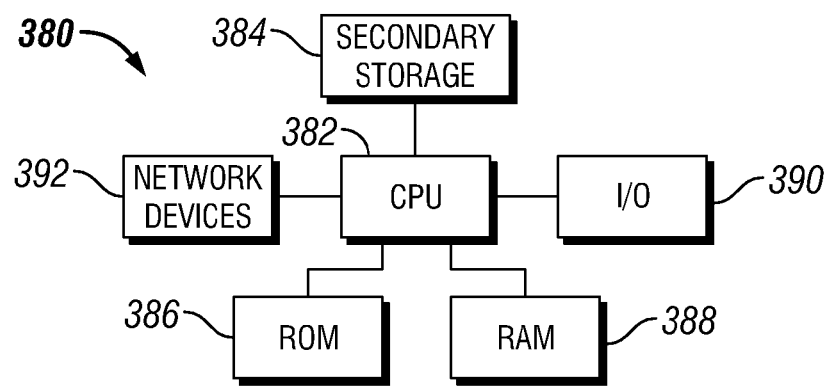
FIG. 4 is a block diagram illustrating an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The above described load testing system 10 and system for generating test data 150 provide a flexible load testing system which achieves a load test which closely matches predicted or forecast operational volume targets and/or transactional mix targets. Information gathered from the load tests may be useful for system and capacity planning, as well as for ongoing system operations and for other purposes.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system to generate test data for load testing a computer system, comprising:
    a forecast maintaining a predicted volume of transactions and a predicted mix of transactions for the computer system;
    an application list maintaining a list of at least some applications of the computer system, the application list related to participation of the at least some of the applications in load testing;
    a generator operable to generate a list of transactions for testing the computer system, using the predicted volume and mix of transactions maintained by the forecast and based on the applications identified by the applications list;
    a transaction set maintaining a set of transactions employed by the system, each transaction including an instruction portion and a data portion, and
    a data set maintaining data for the data portion of the transaction, and wherein the generator generates the list of transactions to a test file further using the transaction set and the data set,
    wherein the generator selects the transaction set from a plurality of transaction sets, whereby the test file generated by the generator contains transactions based on the selected transaction set.

2. The system of claim 1 further comprising a graphical user interface operable to receive control inputs to designate at least a server of the computer system, and to designate a percentage of the predicted volume of transactions maintained in the forecast to be generated by the generator, and further operable for selection of the transaction set from the plurality of transaction sets.

3. The system of claim 1 further comprising a graphical user interface operable to receive control inputs designating the computer system and designating a percentage of the predicted volume of transactions maintained in the forecast to be generated by the generator.

4. The system of claim 3 wherein the graphical user interface is further defined to be web based.

5. The system of claim 1 wherein the test data is further defined to be application back-end test data.

6. The system of claim 1 wherein the predicted mix of transactions maintained in the forecast is further defined as an expected frequency of occurrences of each of a plurality of transaction types for each of a plurality of the applications, and wherein the predicted volume of transactions maintained in the forecast is further defined as the occurrence of each of the plurality of transaction types.

7. A method for load testing a computer system, comprising:
    providing an application list related to a plurality of applications of the computer system, the list related to the participation of the plurality of applications in load testing;
    providing a forecast defining the expected mix of occurrences of each of a plurality of transaction types;
    providing a transaction list of at least some of the plurality of transaction types used by the computer system;

receiving control inputs from a first graphical user interface, the control inputs including a designation of the computer system;

generating a test data file based on the forecast, the transaction list, the designation of the computer system; and running a script using the test data file to send, in a random order, transactions read from the test data file to the computer system to load test the computer system; and selecting, via the control inputs a transaction set comprising at least some of the plurality of transactions from a plurality of transactions sets, the selected transaction set based on portions of the computer system to be load tested.

8. The method of claim 7 wherein the test data file comprises the transactions occurring in both the forecast and the transaction list and excluding transactions of applications predicted by the forecast from applications participating in load testing.

9. The method of claim 8 wherein the forecast includes the frequency of occurrence of each of the plurality of transaction types based upon the applications generating the transaction.

10. The method of claim 7 wherein the running the script includes reading transactions from the test data file in a random order.

11. The method of claim 10 wherein the running the script includes running a plurality of scripts determined based on a volume of transactions predicted in the forecast.

12. The method of claim 7 further comprising monitoring the computer system during the load test using a second graphical user interface.

13. The method of claim 7 further comprising running additional scripts during testing to increase a volume of transactions on the computer system.

14. The method of claim 7 further comprising;
randomly reading, by the script, the test data file; and
sending the transactions randomly read by the script in the test data file to the computer system to load test the computer system.

15. The method of claim 7 wherein the running the script includes increasing a number of instances of the script each randomly providing transactions to load test the computer system.

16. The method of claim 7 wherein the running the script includes increasing a number of instances of the script each randomly providing transactions to determine a load tolerance of the computer system.

17. A system for load testing a computer system, comprising:
a computer system comprising:
a plurality of servers for processing for one or more back-end enterprise applications,
a plurality of message systems, each message system associated with only one of the plurality of servers, and
a plurality of front-end applications, each communicating with at least one of the plurality of servers;
a forecast detailing transactions for the computer system from the front-end applications, the forecast including a predicted volume of transactions and predicted mix of transaction types of the transactions;
a transaction set detailing transactions employed by the computer system;
a graphical user interface operable for selection of at least one of the forecast and the transaction set, graphical user interface further operable for selection of front-end applications based on participation of the front-end application in load testing;
a data generation tool operable, using the forecast and the transaction set, to generate to a test data file transactions of substantially the same percentage mix of transaction types as the predicted mix of transactions types in the forecast, wherein the transactions indicate the message system where the transactions are sent, the data generation tool further operable based on the front-end application participating in load testing to exclude from the test data file transactions from front-end applications participating in the load test;
a plurality of script files operable to read the test data file and communicate the transactions to at least one of the message systems; and
a metrics component in communication with the plurality of servers to obtain a load test status from the plurality of servers and further generate a report based on the load test status.

18. The system of claim 17 wherein the graphical user interface is further operable to select the front-end applications participating in the load test.

19. The system of claim 17 wherein the graphical user interface is further operable to select the front-end applications not participating in the load test.

20. The system of claim 17 wherein one of the plurality of control inputs designates a number of scripts to launch.

21. The system of claim 17 wherein the scripts are operable to randomly select a transaction from the test data file.

22. The system of claim 17 wherein the number of instances of scripts launched for the load test may be adjusted during the load test.

23. The system of claim 17 wherein the graphical user interface is further operable to select a percentage of the predicted volume of transactions to write to the test data file.

24. The system of claim 17 wherein the generator tool is further operable to generate a first test data file for a first message system of the plurality of message systems and further operable to generate a second test data file for a second message system of the plurality of message systems, a first server serviced by the first message system and a second server serviced by the second message system, such that a first script sends transactions from the first test data file to the first message system to load test the first server and such that a second script sends transactions from the second test data file to the second message system to test the second server.

25. The system of claim 17 wherein the data generation tool is further operable to write, in a random order, the transactions to the test data file.

26. The system of claim 17 wherein the plurality of scripts are further operable to randomly read the scripts from the test data file and communicate the transactions to the message systems.

27. The system of claim 17 wherein the plurality of scripts are further operable to provide the transactions to the message systems in a random order.

28. A system for load testing a computer system, comprising:
a computer system comprising:
a plurality of servers for processing for one or more back-end enterprise applications,
a plurality of message systems, each message system associated with at least one of the plurality of servers, and a plurality of front-end applications, each communicating with at least one of the plurality of servers;

a forecast detailing transactions for the computer system from the front-end applications, the forecast including a predicted volume of transactions and predicted mix of transaction types of the transactions;

a transaction set detailing transactions employed by the computer system;

a graphical user interface operable for selection of at least one of the transaction set from a plurality of transaction sets and the forecast, graphical user interface further operable for selection of front-end applications based on participation of the front-end application in load testing;

a data generation tool operable, using the forecast and the transaction set, to generate to a test data file having transactions of substantially the same percentage mix of transaction types as the predicted mix of transactions types in the forecast, the data generation tool further operable based on the front-end application participating in load testing to exclude from the test data file transactions from front-end applications participating in the load test;

a plurality of script files operable to read the test data file and communicate the transactions to at least one of the message systems; and a metrics component in communication with the plurality of servers to obtain a load test status from the plurality of servers and further generate a report based on the load test status.

* * * * *